United States Patent [19]
Horn

[11] 3,757,725
[45] Sept. 11, 1973

[54] RIGHT SPHERICAL SEGMENT-GLASS SHELL-TO METAL-JOINT

[75] Inventor: George M. Horn, San Diego, Calif.

[73] Assignee: The United States of America as represented by the Secretary of the Navy, Washington, D.C.

[22] Filed: Sept. 24, 1971

[21] Appl. No.: 183,483

[52] U.S. Cl. ............... 114/173, 29/463, 114/16 R, 114/66
[51] Int. Cl. ............................................. B63b 19/02
[58] Field of Search ........................ 29/463, 195; 287/189.36; 114/16 R, 173, 177, 66; 52/80

[56] References Cited
UNITED STATES PATENTS

| | | | |
|---|---|---|---|
| 3,450,082 | 6/1969 | Demarest | 114/16 R |
| 3,395,993 | 8/1968 | Bristow | 29/195 |
| 3,555,663 | 1/1971 | Forman | 114/16 R X |
| 2,163,410 | 6/1939 | Pulfrich et al. | 287/189.36 |
| 3,430,611 | 3/1969 | Belter | 277/235 B |

Primary Examiner—Duane A. Reger
Assistant Examiner—Galen L. Barefoot
Attorney—Richard S. Sciascia

[57] ABSTRACT

An improved viewing window construction for deep submersible vehicles and a method of construction thereof is disclosed. A hemispherical glass dome is ground and lapped with an edge radius of twice the dome thickness and fitted on a congruently configured mating ring with a bimetallic gasket providing a strain relieving seal therefor.

5 Claims, 7 Drawing Figures

PATENTED SEP 11 1973 3,757,725

INVENTOR.
GEORGE M. HORN

BY

WILLIAM T. SKEER
AGENT
ERVIN F. JOHNSTON
ATTORNEY

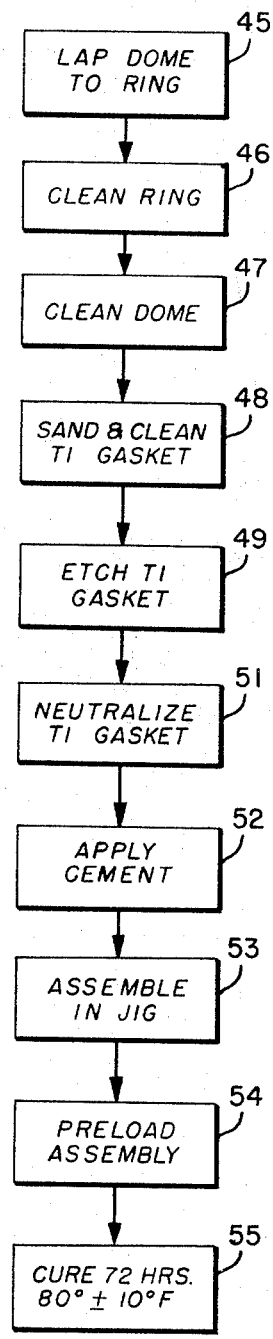
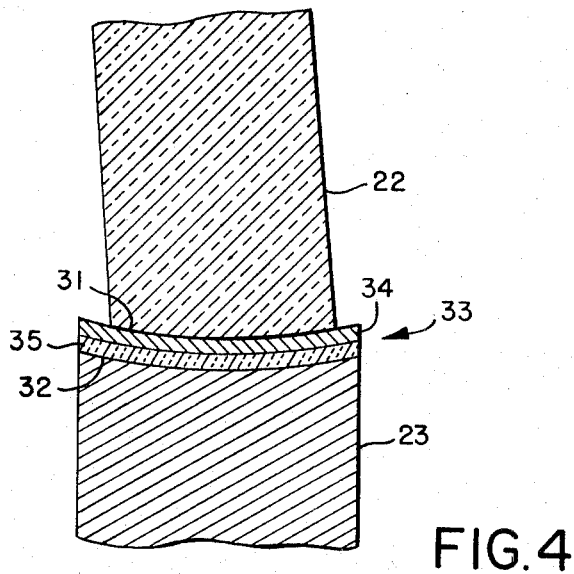
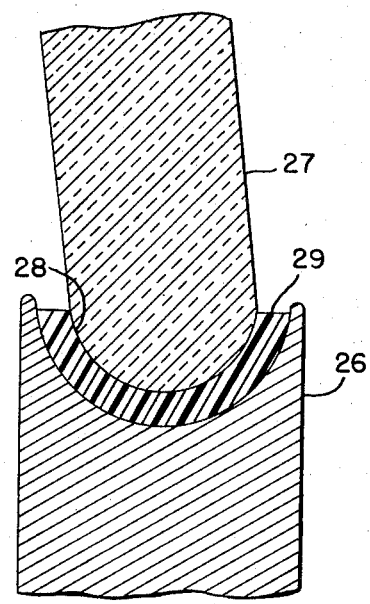
FIG.4
FIG.3
PRIOR ART
FIG.7

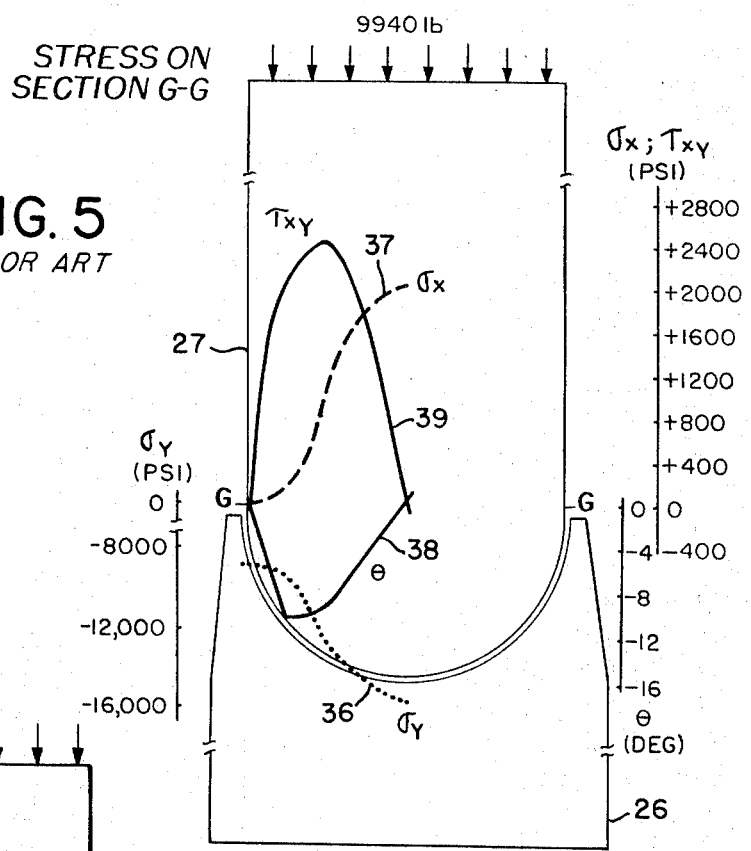
FIG. 5 *PRIOR ART*
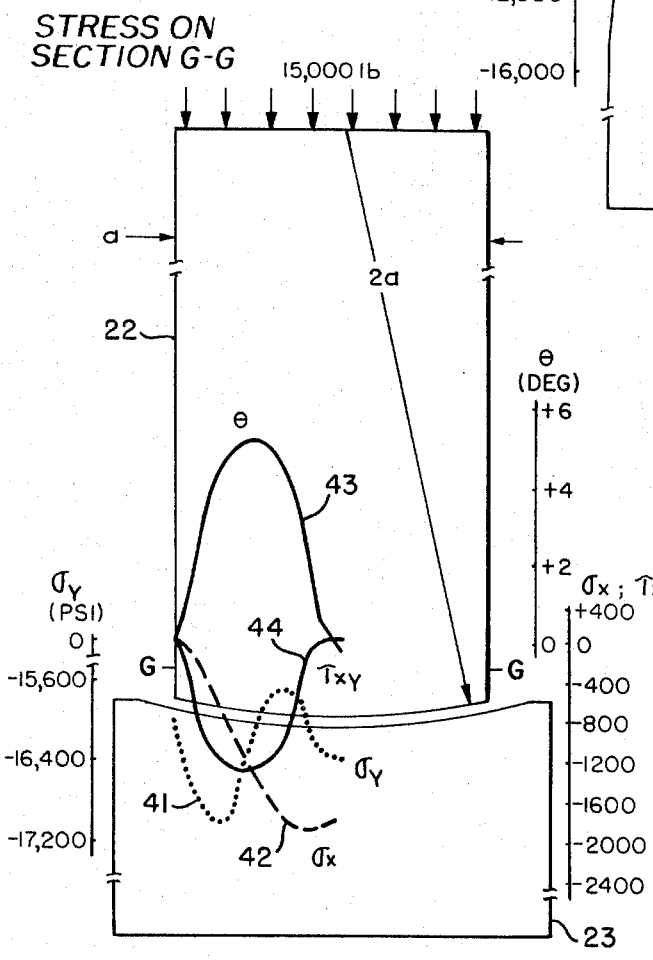
FIG. 6
INVENTOR.
GEORGE M. HORN
BY
WILLIAM T. SKEER
*AGENT*
ERVIN F. JOHNSTON
*ATTORNEY*

RIGHT SPHERICAL SEGMENT-GLASS SHELL-TO METAL-JOINT

STATEMENT OF GOVERNMENT INTEREST

The invention described herein may be manufactured and used by or for The Government of the United States of America for governmental purposes without the payment of any royalties thereon or therefor.

FIELD OF THE INVENTION

This invention relates to the branch of naval architecture pertaining to the field of glass and metal working technology. More particularly, but not by way of limitation, the invention concerns viewing ports installed in the metal hulls of deep submergence underwater vehicles. In still greater particularity, the invention pertains to the fitting of dome shaped glass preforms to metal structural supports. By way of further explanation, the field of the invention embraces the fitting of hemispherical viewing windows in metal hulled deep submergence vehicles such that a watertight seal is produced which, when subjected to high hydrostatic pressures, remains free from destructive stresses in the glass hemisphere.

DESCRIPTION OF THE PRIOR ART

In modern oceanographic research and ocean engineering applications deep submergence vehicles play an important role. Personnel operating these vehicles have descended to great depths to observe and study oceanographic phenomena, geological formations on the ocean floor, and engage in salvage and other research. Prior art submarine vehicles designed for deep ocean depths have afforded the occupants very limited visibility. This limited visibility is due in part to the restrictive size of the viewing apertures and the limited number of such apertures permitted in the deep submergence vehicle. These limitations have resulted from the fact that the viewing apertures in the prior art have had great difficulty in affording a watertight seal between the hull of the deep submergence vehicle and the transparent material in the viewing port. Glass and acrylic, which are usually used for this purpose, have limitations in the amount and type of stress which they can withstand before experiencing structural failure.

These inherent limitations of these transparent materials have limited the prior deep submergence vehicles to a plurality of viewing apertures which are conical or frustroconical. The transparent lens which fits into the apertures has been pressure sealed against the edges thereof by the hydrostatic pressures associated with deep ocean depths at which these vehicles operate. This shape is a result of the stress characteristics of the transparent materials used, including acrylic plastics, which can withstand great compressional forces but is susceptible to internal failures when subjected to tensile stresses. As will be well understood by those familiar with deep submergence vehicles, this frustroconical lens is forced onto the rim of the viewing aperture in such a fashion that the stresses generated in the transparent materials by the hydrostatic pressures are of such a nature as to be within the design limits of the material used.

The view afforded by the conical apertures leaves much to be desired by personnel who wish to have a maximum visibility of the area surrounding the deep submergence vehicle. The conical view permitted by prior art windows requires the vehicle to be repositioned frequently to afford the occupants a complete view of the surrounding area. When operating near the ocean floor, this repositioning of the vehicle frequently disturbs bottom material such as to make the water turbid and, thereby, further obscure visibility. Accordingly, it has long been a desire in the deep submergence vehicle arts to have a large hemispherical transparent viewing aperture to afford large angles of view without a movement of the vehicle itself. Such glass structures are well known in the aircraft arts where they are used in the nose portions of certain types of aircraft. However, heretofor, attempts to incorporate such structure in deep submergence vehicles have been unsuccessful.

The lack of success in deep submergence applications is attributed to two primary design areas; the obtaining of a watertight joint between the glass hemisphere and the deep submergence vehicle itself, and structural failure of the glass dome when subjected to high hydrostatic pressures.

In recent times, vehicles have been designed with transparent nose portions made as glass hemispheres which are capable of operating at moderate ocean depths. One such arrangement is shown in U.S. Pat. No. 3,555,663 to W. R. Forman for "Method of Making an Annular Glass-to-Metal Joint," issued on Jan. 19, 1971. However, when these devices are subjected to extreme hydrostatic pressures, such as encountered in great ocean depths, fissures and internal cracks develop within the dome in the region of the glass to metal joint. Of course, such structural failures require the vehicle to return to the surface for repair and replacement of the dome. Because such repair is lengthy and expensive, the operational limit for vehicles equipped with this type of dome must be set at depths too shallow to be of interest to modern oceanographers engaged in the study of the pelagic deep.

SUMMARY OF THE INVENTION

This invention overcomes the aforedescribed disadvantages of the prior art by providing an improved glass to metal joint. Furthermore, this invention describes an assembly technique and viewing port produced thereby which permits glass domes of the prior art to be fitted to deep submergence vehicles to effect a precision watertight joint and a mating configuration which will withstand enormous hydrostatic pressures. This long sought advance in the art is obtained by an improved glass to metal bonding technique to be described herein. Further, an improved gasket construction and method of mounting thereof is disclosed in the instant invention having extensive application potential.

Accordingly, it is an object of this invention to provide an improved glass to metal joint.

A further object of the invention is to provide a glass to metal joint capable of withstanding extreme hydrostatic pressures.

A further object of this invention is to provide a glass to metal joint which is watertight at extremely high hydrostatic pressures.

Another object of this invention is to provide a method of mounting a glass hemispheric viewing port on a deep submergence vehicle.

Yet another object of this invention is to provide an improved gasket for glass to metal joints.

A still further object of this invention is to provide a fabrication method for assembling a glass viewing dome to a deep submergence vehicle such that a watertight and pressure insensitive joint results.

These and other objects of the invention will become more readily apparent from the ensuing specification when taken with the drawings.

BRIEF DESCRIPTION OF THE DRAWINGS

FIG. 3 is a sectional view of a glass to metal joint of a prior art;

FIG. 4 is a sectional view of a glass to metal joint of the invention taken along lines 4—4 of FIG. 2;

FIG. 5 is a stress diagram of the glass to metal joint of the prior art;

FIG. 6 is a stress diagram of the glass to metal joint according to the invention; and FIG. 7 is a flow diagram illustrating the steps of the method of the invention.

DESCRIPTION OF THE PREFERRED EMBODIMENT

Figure 1:
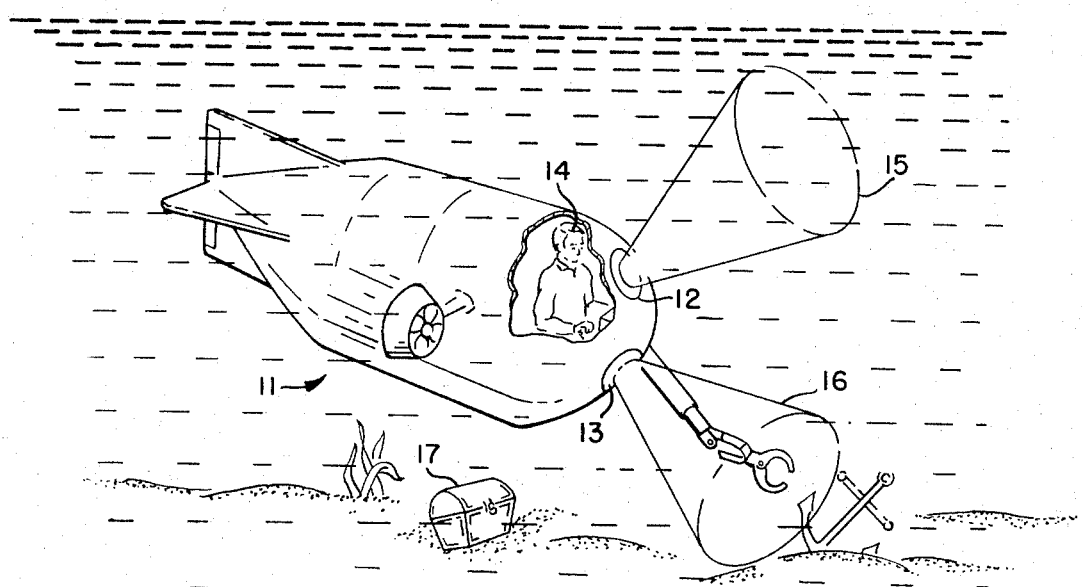
FIG. 1 is a perspective view of a prior art deep submergence vehicle.

Referring to FIG. 1, the deep submergence vehicle 11 is shown operating at a distance above, but close to, the ocean floor. Suitably spaced and dimensioned viewing ports 12 and 13 in the hull on deep submergence vehicle 11 afford the operator 14 views to the exterior thereof. However, as will be observed, the view through viewing ports 12 and 13 is limited to two cones 15 and 16. These cones, termed visibility cones, although strategically placed in the hull of deep submergence vehicle 11 provide a limited view to the exterior thereof. As may be readily understood, objects of interest, such as shown at 17, may escape notice of operator 14. The movement of deep submergence vehicle 11 to place object 17 within one of the visibility cones 15 or 16 frequently stirs up the mud and other debris on the ocean floor such as to make the water so turbid as to obscure object 17 even though it may lie within one of the visibility cones 15 or 16.

Figure 2:
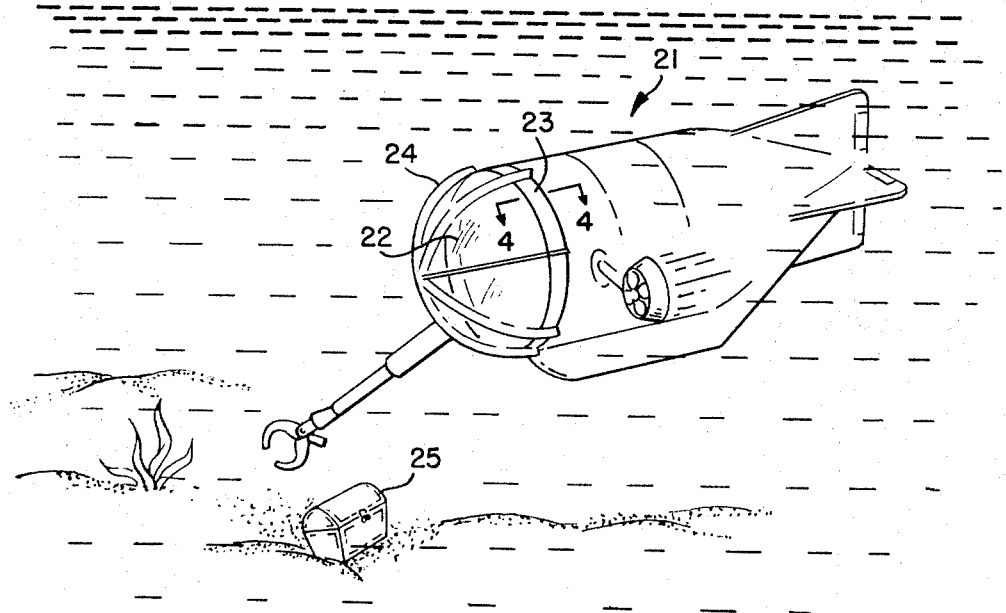
FIG. 2 is a perspective view of a deep submergence vehicle fitted with a glass hemisphere in accordance with the invention.

Referring now to FIG. 2, a deep submergence vehicle 21 according to the invention is shown operating at a similar distance above the floor of the ocean. As will be observed, deep submergence vehicle 21 is equipped with a transparent nose portion comprising glass dome 22 sealed upon a suitable mounting ring 23. Glass dome 22, which in the incident invention is hemispherically shaped, is secured on mounting ring 23 in a fashion to be more completely described herein. However, it should be noted that retaining bands 24 encircle glass hemisphere 23, partially support its weight, and retain it in an abutting relationship to mounting ring 23.

It will be obvious that the panaramic view afforded by glass hemisphere 22 permits objects of interest, such as shown at 25, to be seen without repositioning deep submergence vehicle 21 with respect thereto. Such improved visibility as afforded by glass hemisphere 21 permits better navigation of deep submergence vehicle 21 and much improved visibility of the ocean floor and consequently enhances the vehicle surroundings and likelihood of objects of interest being located.

In view of the success that domed windows have obtained in the aircraft fields, it might seem obvious to incorporate such structure in deep submergence vehicles. However, the nature of glass makes it susceptible to cracks and fissures caused by internal tensile stresses. It is a commonly understood fact that glass will withstand tremendous compressional stresses but weakens and cracks readily when such stresses become tensile in nature. In the prior art, the constructions which made the dome-to-metal seal watertight resulted in such tensile stresses being generated within the glass as to cause structural failure thereof.

Referring to FIG. 3, it will be seen how these forces are generated in the prior art device. As shown, a metal mounting 26 receives a hemisphere glass dome 27. In this prior art arrangement, the edge 28 of glass dome 27 is ground to a rather small radius. The radius of curvature, seen in section in FIG. 3, is usually less than that of the thickness of hemisphere 27. In most cases, this radius is chosen to be half the thickness of dome 27 such that the resulting edge is semicircular in section. A plastic washer 29 is placed between hemisphere 27 and metal mounting 26 to provide a watertight seal for hemisphere 27. The complementary surface of metal mounting 26 is configured to be concentric with the radius of edge 28. It was formerly believed that gasket 29 would serve as a sufficient cushion for hemisphere 27 as well as provide a watertight seal therefor.

The prior art arrangements, of the type shown in FIG. 3, while satisfactory for moderate depths have proven unsatisfactory for extreme depths. In such operational environments, a hydrostatic pressure exerted on the glass hemisphere 27 has forced the semicircular edge through plastic gasket 29 driving it from between hemisphere 27 and metal mounting 26. As a result, the apex of the edge of 27 comes into load bearing contact with metal mounting 26. As will be further described herein, this point of contact pressure causes tensile forces to develop within glass hemisphere 27 resulting in cracks extending along the median plane thereof and upwards into glass hemsiphere 27. Such cracks weaken glass hemisphere 27 to the point where it is unsafe to continue submerged operations.

Referring now to FIG. 4, the improved structure of the invention will be described. As may be seen, edge 31 of glass dome 22 and the mating edge 32 of mounting ring 23 are of the same radius. Further, it will be observed, that the radius of curvature of edges 31 and 32 is considerably in excess of that of the prior art and in excess of the thickness of glass hemisphere 22. In practice, a radius of curvature which is twice the thickness has proven satisfactory and may be regarded as the smallest radius practical in execution of Applicant's invention. The two surfaces 31 and 32 are lap ground together to be of the exact same surface configuration, as will be further described herein. It will also be observed that the surface 32 of mounting ring 23 extends at the same radius beyond the edges of glass hemisphere 22. Interspaced between glass hemisphere 22 and mounting ring 23 is a gasket 33.

As may be seen, gasket 33 is comprised of two layers and, quite naturally, extends across the edge 31 and nearly across edge 32. A titanium foil layer 34 is in contact with edge 31 of glass dome 22. Beneath titanium foil 34, and in contact with mounting ring 32, is a layer of sheet asbestos 35. As will be further explained herein, asbestos sheet 35 and titanium foil 34 are bonded to form a unitary structure. Although not limited to a particular thickness, it should be noted that titanium foil 34 having a thickness of 5/1,000 of an inch (0.005) has proven satisfactory in developmental models. Similarly, a gasket thickness of one sixty-fourth of an inch (0.016) has proven satisfactory for asbestos sheet 35. Asbestos sheet 35 is a compressed asbestos preform having a minimal relaxation under pressures. Compressed asbestos sheet material of this type is manufactured from spinning grade, long asbestos fiber. The binding material preferred for this application is a high heat resistance, non-reverting, synthetic rubber compound. A variety of such gasket material is commercially available, however, for purposes of completeness, it may be noted that that marketed under the trade designator "R/M No. A56" by the Raybestos Manhattan Company of Bridgeport, Conneticut has proven satisfactory.

Mounting ring 23 may be made of any high strength metalic hull material. The important design consideration in the choice of materials and configuration of ring 23 is that it should have the same, or approximately the same, radial deflection characteristics as glass dome 22. The structure used in the practice of the invention has employed a forged titanium ring. Aside from the radial deflection characteristics for which this material was chosen, mounting rings made therefrom are lightweight, an important consideration, and resistant to the corrosive action of seawater.

Glass dome 22 is made of a borosilicate glass composition. Borosilicate glass is chosen because its thermal expansion characteristics make it easy to cast and figure large hemispheres accurately. The importance of the optical and mechanical accuracy in such applications is, of course, obvious. However, its very low coefficient of thermal expansion is not a particularly desirable parameter in the deep submergence vehicle applications. It would be more desirable if glass hemisphere 22 had a thermal expansion characteristic somewhat similar to metal ring 23. However, until the glass working technology has advanced to the point where such hemispheres may be cast of more desirable glass, the borosilicate types may be used satisfactorily. In this regard, it should be noted, that the borosilicate glass marketed under the trade name "Pyrex" by the Corning Glass Company of Corning, New York has been used satisfactorily in the developmental models.

Referring now to FIG. 5, a stress diagram of the prior art construction shown in FIG. 3 will illustrate why this construction has proven satisfactory in deep submergence applications. As will be obvious to those familiar with optical instrumentation techniques, FIG. 5 is a conventional stress diagram employing standard notations. As shown, with a compressional loading of 9,940 pounds on dome 27 having a thickness of 0.856 inches, a vertical stress, shown by curve 36 in excess of 16,000 PSI has developed. However, as indicated by the negative sign this stress is a compressional load and is within the margin of strength of glass. However, as shown by curve 37, a horizontal stress of well over 2,000 pounds per square inch is developed which, as indicated by the positive sign, is a tensile load. As previously noted, glass has a very limited tensile strength and this figure is in excess of the margin of safety to which such glass domes should be subjected. Likewise, as indicated by curve 38, the angle of principal stress varies from zero degrees to well over twelve degrees where a sheer stress, indicated by curve 39 in excess of 24,000 pounds per square inch has developed. This horizontal tensile component stress arising in this construction causes cracking and fissures to develop within glass dome 27 originating at the point of contact, usually in the median plane of the glass, and extending upward into dome 27. Such limitations, which frequently occur at slight microscopic irregularities, cause the glass to fail at hoop stresses in excess of 10,000 PSI. Such failures obviously reduce the margin of safety at which glass hemispheres with the edge configurations shown in FIGS. 3 and 5 may be used.

Referring now to FIG. 6, a similar pressure versus stress diagram is shown for the construction of the invention. As may be seen, a loading of 15,000 pounds per square inch results in a vertical stress being placed upon the glass of approximately 16,000 PSI, as indicated by curve 41. The horizontal component of the stress as shown by curve 42 attains a magnitude of approximately 2,000 PSI. However, as indicated by the negative sign, this force is a compressional force and well within the strength specifications of the glass. Curve 43 indicates that the angle of principal stress attained at an angle of approximately 7° where the sheer stress maximum occurs at −1,600 PSI.

From the foregoing description of FIG. 6, it may be seen that despite greater loading placed upon the construction of the invention none of the stresses are a positive or a tensile nature such as would result in glass failure. Further, it will be noted that because of the loading in the vertical direction at the edges of the glass the gasket material, not shown in FIG. 6, tends to remain centered under the edge of glass dome 22 and mounting ring 23 rather than being driven therefrom as the gasket used in prior art constructions. It is because of this improved gasket and glass interaction that the gasket arrangement of the invention stays in place and watertight under far greater pressure than can be tolerated by the prior art constructions.

Practical tests have proven the accuracy of the aforedescribed laboratory results.

Referring now to the flow diagram of FIG. 7, the manufacturing techniques that result in the improved construction of the incident invention will be described. Mounting ring 23 and glass dome 27 are secured in suitable grinding fixture, not shown. The optical figuring of dome 27 may be done in this fixture or prior to placement in the grinding fixture. Such fixtures will be familiar to those proficient in the glass working arts. Glass dome 22 is lapped in the grinding fixture against mounting ring 23 using a slurry of No. 240 aluminum oxide lapping compound and water until glass hemisphere 22 and mounting ring 23 have a mating surface ground to an identical radius. Other abrasives may, of course, be used such as diamond dust, for example. It will be noted that the grinding fixture and technique produces a mating surface on mounting ring 23 which is exactly as wide as the thickness of glass hemisphere 22 although it will be observed that mounting ring 23 is somewhat wider than dome 22. By way of example, glass dome 22 may be of approximately 1.25 inches in thickness and the mounting ring 23 will have a corresponding thickness of 2 inches and will be lap ground to the dome in a band 1.25 inches wide extending around this face. This lapping step is represented in the flow diagram by block 45.

As indicated by block 46, the next step in producing Applicant's invention is the cleansing of ring 23 to remove the aluminum oxide or other grinding compound therefrom. This cleansing step comprises flooding with methyl-ethylketone of a commercial grade, abbreviated M.E.K. hereafter, and wiping dry with an absorbent tissue leaving no lint thereon. Further cleaning to remove residues not removed by the M.E.K. is performed by using suitable solvents. One such solvent which has proven satisfactory in the performance of Applicant's invention is that marketed as "Metal Cleaner" by the Photoelastic Company, Incorporated of Malvern, Pennsylvania. Next, the metal surface of mounting ring 23 is etched with a suitable etching material, that marketed under the name "Metal Conditioner" by Bean, Incorporated of Detroit, Michigan has proven satisfactory for the purposes of the invention. Again, excess etchent is removed by absorbent tissue chosen to be of a type which leaves no lint. Next, mounting ring 23 is cleaned with a suitable neutralizer to stop the action of the etchent and wiped clean with non-lint tissue. The type of neutralizer employed will depend, of course, upon the type of etchent which was employed previously.

Quite logically, the next step in the performance of the invention, indicated by block 47, is the cleaning of dome 22. The same degree of cleanliness is required for dome 22 as that for mounting ring 23, however, because of the nonabsorbent nature of glass, the cleaning process is somewhat more straightforward. In practice it has been sufficient to clean dome 22 by bathing in suitable quantities of M.E.K. and wiping clean and dry with a suitable neutralizer and absorbent non-linting tissue.

As indicated by block 48, the next step in the performance of the method of the invention is the sanding and cleaning of the titanium gasket foil material. In general, this cleansing procss follows closely that used to cleanse mounting ring 23 and described above in connection with block 46. That is, titanium foil is first sanded with 360 grit silicone carbide paper which has been wetted with M.E.K. to obtain a bright metal surface. Next, the surface is wiped clean with more M.E.K. and non-linting tissue. Following this cleansing, further cleansing is performed with a suitable solvent, for example, "Metal Cleaner" as described above. Next, as indicated by block 49, the surface of the titanium foil is etched with a suitable etchent, that used on mounting ring 23 and described above has proven satisfactory. Following the etching, the etchent is neutralized with a suitable neutralizer and again cleaned with absorbent, non-linting tissue, as indicated in block 51. As will be obvious to those proficient in the art, this treatment of titanium gasket foil 34 is performed on both sides thereof.

Next, the mating surfaces of glass hemisphere 22 and mounting ring 23, both sides of titanium gasket foil 34 and asbestos sheet gasket 35 are coated with a suitable epoxy cement. This step, indicated by block 52 in the flow diagram of FIG. 7, is performed in a conventional fashion. Any suitable epoxy cement having the desired adhesion properties to the specific substances comprising the assembly may be used. However, it should be noted that that marketed under the trade designator "Shell Epon 826" marketed by the Shell Chemical Company of New York, New York has proven satisfactory in the incident invention.

As shown by block 53, the next step in the performance of the invention is the assembling of the component parts of the viewing port, i.e. hemisphere dome 22, titanium gasket foil 34, asbestos gasket 35, and mounting ring 23. This assembly is performed in the jig which was used to lap dome 22 to ring 23. This step is indicated in block 53. When assembled in the jig, the assembly is preloaded by 600 pounds of force being applied to close the joint together as indicated in block 54. This closing force may be conveniently applied by placing bags of sand on a plywood cover on mounting ring 23. Six bags weighing 100 pounds each have proven satisfactory to provide this closing force. The purpose of this closing force is, of course, to deform the gasket to the shape of dome 22 and mounting ring 23.

As shown by block 55, the final step in the construction of the viewing port of the invention is the curing of the assembled cemented assembly. The precise time and temperature of curing, of course, depends on the nature of the cement which was used to join glass hemisphere 22 and mounting ring 23 together with the gaskets 34 and 35, however, when using "Shell Epon 826," the assembly is cured for 72 hours at a temperature of 80° F.

The mounting of the assembled glass hemsiphere and mounting ring 23 to deep submergence vehicle 21 follows conventional marine architecture procedures for vehicles of this type. That is, conventional fasteners and sealants are employed. Accordingly, further description of the construction of the completed deep submergence vehicle 21 is not included herein. Retaining bands 24 which are attached to retaining ring 23 and extend about glass hemisphere 22 may be applied to the cemented assembly prior to the installation thereof on deep submergence vehicle 21. However, if desired, retaining bands 24 may be installed after the assembled viewing port is mounted on vehicle 21. Likewise, the completed viewing dome may be mounted on other portions of deep submergence vehicle than the forward end, if desired.

The completed assembly, though relatively simple in appearance, meets the problems of the prior art in an effective manner hereto unattainable. In the assembly, asbestos sheet portion 35 of gasket 33 provides a relatively soft cushion to compensate for any lack of absolute flatness of the various parts. This lack of flatness may arise as the result of differential heating and cooling or other irregularities produced by conditions after the lap grinding of glass hemisphere 22 to moutnting ring 23. Gasket 33 serves to prevent differences in radial deflection due to hydrostatic pressures or thermal expansion from creating and bending moments in the glass. The particular radiuses of curvature and gasket cooperation prevent titanium foil 34 from being forced from between glass hemisphere 22 and the asbestos gasket 35 because of the increased pressure at the edges of glass hemisphere 22 as shown in FIG. 6. Titanium foil 34 has a very low Poissons to Young modules ratio and thereby prevents radial tension from being transmitted into the glass due to the high Poissons to Young module ratio of the asbestos gasket 35. Titanium gasket foil 34 and mounting ring 23, when it is made of titanium, are unaffective by the corrosive action of seawater. These specific structural attributes present in the instant invention are not to be found in the prior art. Their combination results in an improved structure which meets the objects of the invention and constitutes a profound improvement in the deep submergence vehicle art.

The foregoing description taken together with the appended claims constitute a disclosure such as to enable a person skilled in the glass and metal working arts and having expertise in the naval architectural arts and having the benefit of the teachings contained therein to make and use the invention. Further, the structure and method herein described meet the objects of the invention, and generally constitute a meritorious advance in the art unobvious to such skilled workers not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. A viewing port for a deep submergence vehicle comprising in combination:
   transparent dome means having a convex edge for passing a wide angle of light therethrough;
   mounting ring means joined to the deep submergence vehicle on one side and concavely lap ground to mate with said convex edge of said transparent dome means on the other side along a radiused interface having a radius substantially greater in length than the thickness of the wall of said transparent dome, said mounting ring means having the same radial deflection characteristics of said transparent dome means for attachment to the hull of said deep submergence vehicle; and
   bilayer gasket means placed between said transparent dome means and said mounting ring means and for isolating strain transmission therethrough caused by the ratio of Poisson and Yound moduli of the materials from which said transparent dome means and said mounting ring means.

2. A viewing port according to claim 1 in which said transparent dome means includes a one piece borosilicate glass hemisphere.

3. A viewing port for deep submergence vehicles comprising in combination:
   transparent dome means for passing a wide angle of light therethrough;
   mounting ring means concavely lap ground to mate with a convex edge of said transparent dome means along a radiused interface having a radius of curvature of twice the thickness of said transparent dome means and having the same radial deflection characteristics thereas for attachment to the hull of said deep submergence vehicles; and
   bilayer gasket means placed between said transparent dome means and said mounting ring means and for isolating strain transmission therethrough caused by the ratio of Poisson and Young moduli of the materials of said transparent dome means and said mounting ring means.

4. A viewing port for a deep submergence vehicle comprising in combination:
   a transparent borosilicate glass hemisphere for passing a wide angle of light therethrough;
   a mounting ring made of titanium and joined to the deep submergence vehicle on one side and lap ground to mate with said transparent dome means on the other side along a radiused interface having a radius substantially greater in length than the thickness of the wall of said transparent dome, said mounting ring means having the same radial deflection characteristics of said transparent dome means for attachment to the hull of said deep submergence vehicle; and
   bilayer gasket means placed between said transparent dome means and said moutning ring means and configured to isolate strain transmission therethrough caused by the ratio of Poisson and Young moduli of the materials from which said transparent dome means and said mounting ring means are fabricated for effective strain isolation therebetween.

5. A viewing port according to claim 1 in which said bilayer gasket means includes:
   a mounting ring contacting layer made of spinning grade, long asbestos fiber held in a heat-resistant, non-reverting synthetic rubber binder; and
   a transparent dome contacting layer made of titanium metal.

* * * * *